Nov. 14, 1961     R. P. CARREKER, JR     3,008,201
APPARATUS FOR THE CONTINUOUS FORMATION OF INTERMEDIATES
Filed Aug. 24, 1955     2 Sheets-Sheet 1
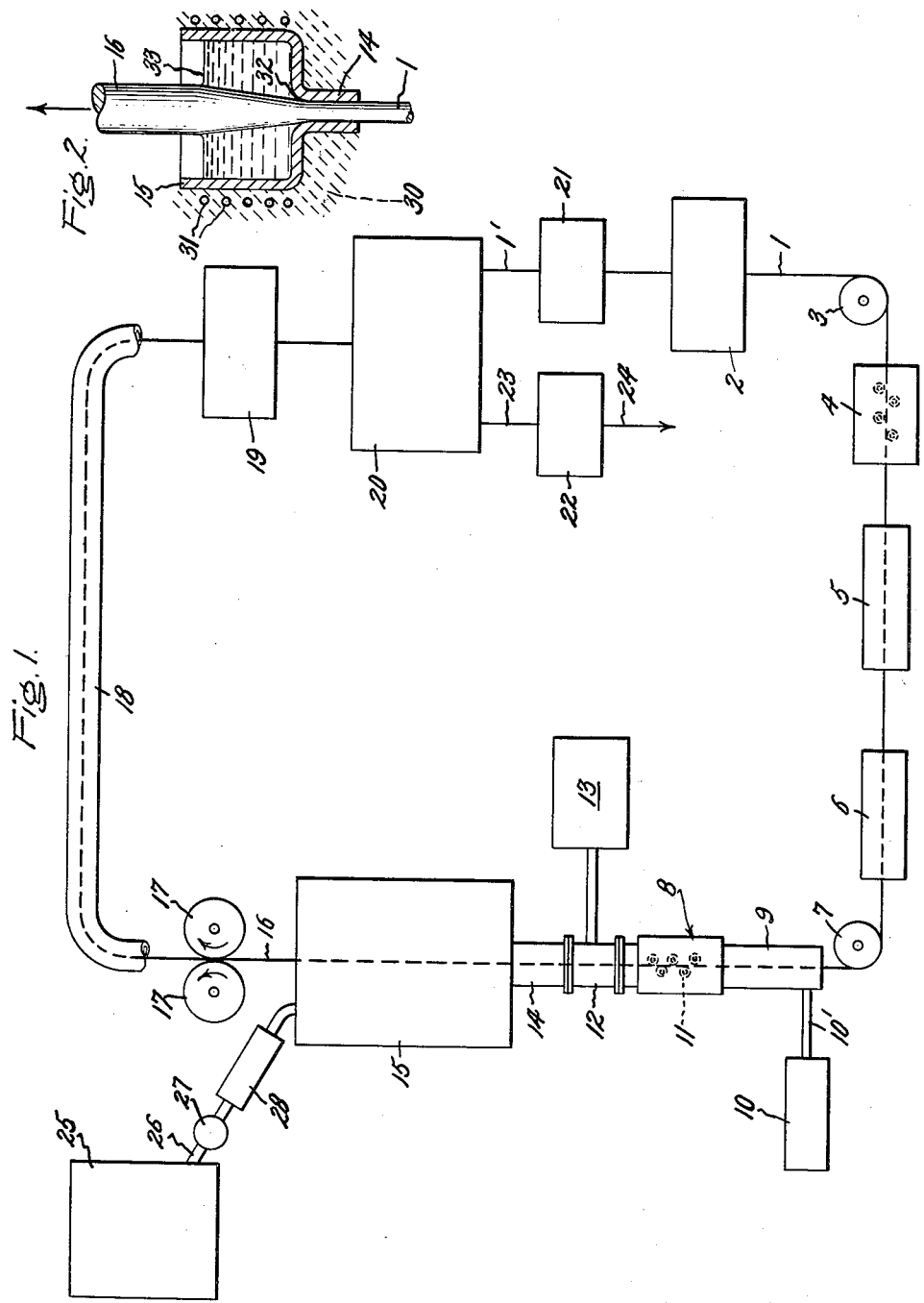
Inventor:
Roland P. Carreker Jr.,
by Paul A. Frank
His Attorney.

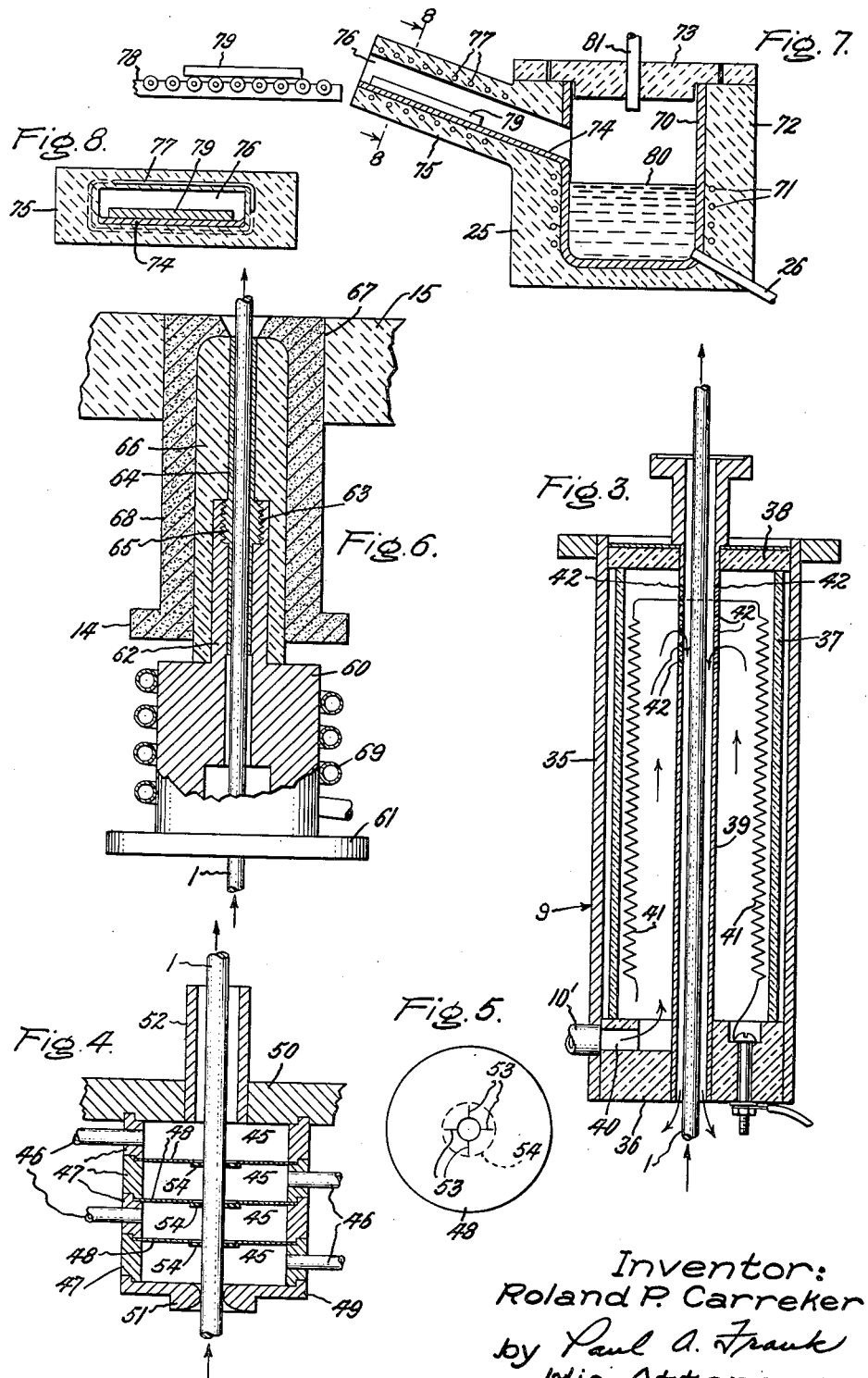

United States Patent Office 3,008,201
Patented Nov. 14, 1961

3,008,201
APPARATUS FOR THE CONTINUOUS
FORMATION OF INTERMEDIATES
Roland P. Carreker, Jr., Schenectady, N.Y., assignor to
General Electric Company, a corporation of New York
Filed Aug. 24, 1955, Ser. No. 530,283
6 Claims. (Cl. 22—57.2)

This invention relates to the continuous production of solid materials from the fluid state and more particularly to a process and apparatus whereby a solid body of substantially homogeneous composition may be continuously produced by accretion.

A large portion of the cost of manufacturing sheet, rod, tube, strip and filamentary stock materials is directly assignable to the expenses incurred in the manufacture of the primary and intermediate forms of the material from which these stock materials are manufactured. For example, in the manufacture of a stock material such as copper wire, a large capital investment is required for equipment such as large melting furnaces, large casting apparatus, ingot or "wire bar" reheating furnaces, primary and secondary rolling equipment, pickling apparatus, heavy duty handling apparatus and the like, in order to produce "wire rod stock" (an intermediate stock material) which may then be drawn into wire of appropriate size through conventional wire drawing apparatus. Substantially the same basic apparatus is needed for the manufacture of intermediate stock material to be formed into tubes, sheets, rods, strip and like stock materials, as well as specialty stock materials such as bus bar, for example. While the foregoing examples relate to copper, it is obvious that substantially the same manufacturing procedure is followed with both ferrous and other non-ferrous metals and alloys and to some degree with some non-metallic materials.

In general, it may be said that a large portion of the cost of such stock materials is the result of employment of expensive equipment and necessary labor to process raw materials into an intermediate material having the necessary properties and dimensions to then be formed into the above-recited stock materials.

My invention is concerned with a process and apparatus for continuously producing intermediate stock materials for the further production of the above-mentioned stock materials and which may be readily combined with conventional apparatus for the production of such stock materials. A principal object of my invention is the provision of apparatus for continuously casting intermediate stock material. A further object of my invention is the provision of apparatus for substantially continuously producing stock materials such as wire, sheet, tube, strip and rod stock without employing large melting, casting and rolling equipment. A yet further object of my invention is the provision of an apparatus for the continuous production of stock materials whereby a portion of the product may be recirculated in a cyclical manner. A still further object of my invention is the provision of a continuous process for the production of stock materials whereby a portion of the product may be recirculated in a cyclical manner.

Briefly stated, in accordance with one aspect my invention relates to apparatus for continuously depositing by accretion, liquid or molten material upon an elongated body having a first cross-sectional configuration and area such as a rod, tube, sheet, strip or wire, for example, having the same or substantially the same chemical composition as the liquid material, thereby forming an elongated body having a second cross-sectional area greater than the first. The apparatus of my invention is adapted to reduce the cross-sectional area of at least a portion of the elongated body having the second cross-sectional area to substantially the cross-sectional area and configuration of the first elongated body and means are preferably provided for the removal of a length of the elongated body corresponding in volume to the amount of liquid or molten material deposited or accreted upon the elongated body as the product. The remaining portion of the elongated body is substantially identical in composition, cross-sectional area, configuration and volume to the elongated body prior to accretion and means are provided for re-circulating this remaining portion through the apparatus and to repeat the cycle as often as may be desired. In practicing my invention in its broader aspects it will occur to those skilled in the art that the principles disclosed hereinafter may be applied for continuously casting many different materials and to form many different products.

My invention will be better understood from the following description taken in conjunction with the accompanying drawings and its scope will be pointed out in the appended claims.

In the drawing, FIG. 1 is a schematic illustration of the various elements of my invention and their relationship to each other.

FIG. 2 is a schematic representation of a vertical section of an embodiment of an element of my invention illustrated in FIG. 1.

FIG. 3 is a sectional view of a drying apparatus incorporated in my invention.

FIG. 4 is a vertical section of a portion of my apparatus which may be conveniently referred to as a vacuum entrance chamber.

FIG. 5 is a detail of an element of FIG. 4.

FIG. 6 is a vertical section of a portion of my apparatus which may be referred to as the entrance port.

FIG. 7 is a schematic vertical section of a melting furnace adapted to be used with my apparatus.

FIG. 8 is a section taken along line 8—8 of FIG. 7 showing a detail of the furnace.

In its broader aspects my invention may best be understood and described with reference to FIG. 1 of the drawing which is a schematic representation of an embodiment thereof. As shown in FIG. 1, an elongated body 1 of a length of a material in the solid state having a first cross-sectional configuration and area is continuously withdrawn from a storage means 2 such as a reel or the like and is guided by any appropriate means such as a sheave, pulley or drum 3, through preliminary treatment apparatus which may consist of a conventional straightener 4, a conventional surface cleaning apparatus 5, for example, an electrolytic cleaning bath, and a rinsing or washing bath 6. The straightened, cleaned and still wet body 1 is guided by means 7 which is similar to guide means 3 into and through an elongated enclosure or tubular conduit 8 comprising a drying means 9 which may be supplied with a neutral atmosphere from a source 10 by means of conduit 10', conventional power driven feeder rolls 11 which frictionally engage and drive body 1 into a vacuum entrance chamber 12 provided with a vacuum source 13, which permits the body to pass therethrough but which prevents the passage of atmosphere therewith, as will be described in greater detail subsequently, and an entrance port 14 provided in the bottom of a crucible 15. The body 1 is then passed through a bath of molten material contained in crucible 15, the bath having the same chemical composition as body 1.

Molten material in crucible 15 accretes or deposits and solidifies upon the outer surface of the body 1 increasing its cross-sectional area appreciably into an elongated body 16 of substantially homogeneous composition which, after emerging from crucible 15, may be passed between sizing apparatus, such as a pair of sizing rolls 17 if desired which functions to remove or correct minor surface irregularities. Body 16 is guided by means of a cooling duct or conveyor 18 to any suitable receiving means such as a reel 19 where it may be temporarily allowed to accumulate. Body 16 is withdrawn from the receiving means 19 and passed through conventional reducing apparatus 20 such as, for example, wire, rod or tube drawing apparatus or rolling equipment wherein the body 16 is reduced to a body 1' having a cross-sectional area and configuration substantially identical to body 1. In the event that body 1 is a flat strip or sheet it will be understood that it may be convenient to cut the material into discrete lengths and subsequently rejoin them and it may be necessary to remove some material from the edges of the body by a slitting or like operation in order to attain the desired cross-sectional configuration and area.

Body 1' is preferably allowed to accumulate at a temporary storage means 21 such as a reel or the like, until a length of material has been produced substantially equal to the length of original body 1. At this point, preferably body 1' is cut and the remainder of the body diverted to storage means 22 as product 23. As indicated by arrow 24 product 23 may be substantially continuously fed to other fabricating apparatus or may be packaged at this point as a final product.

The portion of body 1' temporarily stored at 21 is supplied to storage means 2 and serves to replenish body 1 and permit continuous operation of the apparatus.

As the body 1 is continuously passed through crucible 15 and the molten material contained therein, molten material is continuously removed from the crucible. In order to control quality and to maintain continuous operation, the depth of the molten material in the crucible is preferably maintained substantially constant by continuously resupplying the bath and crucible 15 with additional molten material at a rate commensurate with the rate of removal. This may be conveniently accomplished by providing a melting apparatus such as a furnace 25, for example. Material having the appropriate composition, i.e., substantially the same as body 1, is melted in the furnace 25 and permitted to flow therefrom via a conduit 26, regulating valve 27 and a heated launder or conduit 28 into the bath contained in crucible 15.

From the foregoing it may be readily seen that I have provided an apparatus in which continuous casting by accretion upon a length of stock material provides an intermediate stock material which may be processed to provide additional stock material for recirculation through the apparatus in a substantially continuous supply of product. It will be readily appreciated by those skilled in the art that the foregoing disclosed apparatus may be conveniently utilized to produce stock materials such as wire, rod, bar, strip, tubular or sheet material composed of any material capable of being continuously cast in this manner.

It will be appreciated that certain modifications and alterations of the apparatus may be necessary or desirable depending upon the mechanical and physical characteristics of the material being produced. For example, if a material such as copper, for example, is used and it is to be worked cold in the reduction apparatus 20, it is necessary that the residual heat from the casting operation be extracted from body 16 before it is introduced into the reduction apparatus. In this event, conduit 18 is preferably provided with any effective cooling means such as coils through which coolant may be circulated and water may also be sprayed on the body 16 if desired, to supplement or accelerate the cooling. Additionally, since the temperature of body 16 is only a few degrees below its melting point as it emerges from the bath, it may be desirable to enclose the melting crucible 15, sizing roll 17, and cooling conduit 18 and to provide a protective or reducing atmosphere therein to prevent excessive oxidation of body 16 while it is at elevated temperatures.

If, on the other hand, body 16 may more advantageously be hot worked, the cooling function of conduit 18 may be omitted. Similarly, if surface oxidation of body 16 is an insignificant incident, the protective atmosphere provisions recited previously may be omitted.

In view of the fact that any suitable commercially available apparatus may be used at temporary storage stations 2, 19, 21 and 22 and since the specific details of such apparatus are well known in the materials handling art, no further discussion of this matter will be undertaken at this point. Similarly, the specific details of guides 3 and 7, the straightener 4, the electrolytic cleaner 5, the washer 6, the feeder rolls 11, sizing roll 17, cooling conveyor or conduit 18, valve 27 and heater launder or conduit 28 are well known in the art and will not be discussed in further detail.

In its broader aspects, my invention relates to the continuous casting or deposition by accretion of a molten material upon an elongated body of the same material moving through the molten material to produce an elongated body of greater cross-sectional area, a portion of which is reduced by plastic deformation to the original cross-sectional dimensions of the elongated body before accretion and retreated while the remainder of the so-produced elongated body is abstracted or reserved as the product. An important feature of my invention resides in the continuous casting apparatus thereof.

With particular reference to FIG. 2, the continuous casting or accretion crucible 15 schematically shown is preferably surrounded by any satisfactory thermal insulating material 30 in which is embedded a controllable heating means such as electrical heating elements 31, for example. The crucible is provided with an opening 32 in its bottom, preferably comprising a collar-like structure or entrance port 14 which provides a passageway for elongated body 1. The internal dimensions and cross-sectional configuration of the passageway in the entrance port 14 are such that while body 1 may freely pass through, the clearance is small enough so that molten material in bath 33 may not leak downwardly around body 1 as it passes upwardly through the entrance port 14 and bath 33.

In operation, body 1, shown as a rod having a circular cross-section for purposes of disclosure, is continuously passed upward through the entrance port 14 and bath 33 and emerges from the bath as elongated body 16 having a larger cross-sectional area but retaining the general configuration of body 1, or, as illustrated, a circular cross-section.

As shown, as the relatively cold body 1 passes through bath 33 it extracts heat from the molten material of the same composition in the bath in contact with its surface and this molten material is deposited upon the surface of body 1 causing it to progressively increase in size by the accretion. Because the deposited material has the same chemical composition as body 1, the resulting body 16 is compositionally homogeneous.

I found, however, that when a molten material such as molten copper, for example, is applied in this manner to a copper rod or bar, that relatively minor oxide films or other surface carried impurities such as oil or grease films on the rod may cause gross surface irregularities to be formed on the resulting body 16. The elimination of these surface impurities by subjecting the incoming copper rod or bar to any acceptable cleaning and descaling treatment such as, for example, by passing the rod or bar through a conventional electrolytic cleaner 5 and a washer 6 did not entirely eliminate this difficulty although this treatment reduced the magnitude and frequency of the imperfections.

In order to more completely eliminate these surface imperfections in body 16 apparatus is provided to remove any residual water film on the body emerging from the washer 6 and to sweep out air and water vapor from the tubular conduit 8 leading to entrance port 14. This drying apparatus 9 is provided as schematically illustrated in FIG. 1 and more particularly shown in FIG. 3.

The drying apparatus 9 illustrated in FIG. 3 comprises a tubular outer member 35 having one of its ends substantially closed by a centrally and radially apertured plug member 36. A thermally insulating tubular member 37 made of any suitable material such as bonded asbestos or the like is supported within member 35 by plug 36 and is retained in place by a centrally apertured plug 38 located adjacent the other end of member 35. A tubular member 39 is axially extended through member 35 and the central apertures of plugs 36 and 38 and is supported thereby. A tubular conduit 10′ extends through the side wall of member 35 and provides for the introduction of gas from source 10 into the zone between tubular members 37 and 39 by means of the generally radial passage 40 in plug 36 as illustrated. Electrical heating elements 41 are provided for supplying heat to the incoming gas and a plurality of small openings 42 are provided in the side wall of member 39 adjacent to plug 38. As shown, body 1 passes through the interior of member 39 as indicated by the arrows and the openings 42 are inclined with respect to the surface of body 1 in such a manner that a neutral gas such as nitrogen entering the zone between members 37 and 39 by means of passage 40 is heated therein by heating elements 41 and passes through openings 42 which act as jet nozzles to impinge the jets of heated gas upon the surface of body 1 in a direction opposite to the direction of movement of the body. The heated gas flows through the zone between body 1 and member 39, drying the surface of body 1 and is permitted to escape to the atmosphere at the open end of member 39 adjacent plug 36 sweeping out air and water vapor from the zone.

The body 1 is then passed through a set of conventional feeding rolls 11 enclosed in conduit 8 as shown in FIG. 1, and into a vacuum entrance chamber which is shown in FIGS. 4 and 5 which functions to remove contaminants such as gases and water vapor from the tubular conduit 8 and to prevent the aspiration of air or other gases into the bath 33 by the body 1.

The vacuum entrance chamber shown in FIG. 4 comprises essentially a plurality of substantially identical smaller evacuated chambers 45 each served by a vacuum source such as a pumping means by means of conduits 46. The small chambers 45 are enclosed by substantially identical wall members 47 and are separated by substantially identical diaphragm members 48 which are secured in spaced relationship by the wall members 47 as shown. The terminal chambers 45 are enclosed by enclosure elements 49 and 50 which cooperate with adjacent wall elements 47 as shown. Element 49 is provided with a centrally located apertured boss 51, the aperture comprising a curved surface having a minimum inside diameter sufficiently large enough to permit easy motion therethrough of body 1. Element 50 comprises a centrally apertured plate-like element which supports a short tubular extension 52 as shown. The diaphragm elements 48 are centrally apertured and are each provided with a plurality of radial slits 53 as may be more clearly seen in FIG. 5. The central apertures have configurations similar to the cross-section of and only slightly smaller than body 1. A centrally apertured flexible gasket 54 of an elastomeric substance such as rubber is affixed or bonded to one side of each element 48 in such a manner that as body 1 is passed through the central aperture of element 48 the slits 53 permit the aperture to expand slightly to accommodate the body and the gasket 54 serves to seal the slit openings and any gap between the surface of body 1 and the portions of the diaphragm between adjacent slits 53. As body 1 passes sequentially through the several evacuated chambers 45, contaminants such as gases and water vapor are removed from the surface of the body and any gases or water vapor which may be drawn in through the aperture in boss 51 are removed by conduits 46. It is to be understood that the apertures through which body 1 passes may have any shape consistent with the configuration of body 1.

Body 1 is then pressed through an entrance port 14 located in the bottom of crucible 15 as shown in FIG. 1 and, more particularly, in FIG. 6. It was determined that an entrance port 14 such as schematically shown in FIG. 2 was not satisfactory if made as an integral part of a crucible made from a soft refractory material, such as graphite, because of mechanical attrition thereof by body 1 and the tendency of such materials to deposit in a surface film upon the body. Further, the entrance port must be capable of withstanding a thermal gradient of the order of over 1000° C. to 25° C. in a short distance, repeated heating and cooling cycles, and mechanical shock without conducting a large amount of heat and without wearing or leaving a deposit on the input body 1 and must be constructed of a material which resists dissolution by the molten bath.

The entrance port which I have provided and illustrated in FIG. 6 comprises a centrally apertured cylindrical bushing element 60 of a thermally conductive material such as copper having a flange 61 at one end and a reduced cylindrical extension 62 at its other end. The centrally disposed aperture at the outer end of extension 62 is enlarged and internally threaded as shown at 63. A thin wall tubular element or bushing 64 of a refractory metal such as molybdenum is provided with a threaded collar 65 at about its midpoint and is threadedly secured to extension 62 with a portion of its length, forming a liner for extension 62 as shown. A substantially cylindrical bushing 66 of a ceramic material, such as fired alumina or the like, is provided with a central aperture which receives extension 62 and that portion of tubular element 64 which extends beyond the terminal portion of extension 62. The bottom wall of crucible 65 is provided with an aperture 67 within which is secured a substantially cylindrical centrally apertured bushing 68 of a refractory material such as graphite which retains within its aperture ceramic bushing 66 as shown. Cooling means such as coil 69 through which coolant may be circulated is in heat exchange relationship with element 60 as shown and serves to extract heat from element 60 and tubular element 64.

In operation, body 1 passes through the central aperture of element 60 and through the refractory metal tubular member 64 and emerges in the bath of molten material contained in crucible 15. The internal dimensions and configuration of tubular member 64 is such that body 1 may freely pass therethrough but molten material may not leak downwardly along body 1.

As previously stated, it is desirable to continuously supply crucible 15 with molten material at a rate equal to the rate at which molten material is removed therefrom by accretion on body 1. An apparatus for supplying molten material in this manner is illustrated in FIGS. 7 and 8.

In FIG. 7 a crucible 70 is provided with heating element 71 embedded in a thermal insulating shield 72 surrounding the crucible 70. A thermal insulating cover 73 is provided for the crucible. An inclined melting hearth 74 is in communication with the interior of the crucible and is provided with a thermal insulation 75 which extends around and above the inclined hearth to form enclosed passage 76 opened at its outer and inner ends as shown. Heating elements 77 are embedded in the thermal insulation 75 and heat the hearth and the enclosed passage as may best be seen in FIG. 8. A roller type conveyor 78 may be advantageously employed to deliver slabs 79 of material to be melted to the inclined hearth.

In operation, slabs 79 of material are placed upon the inclined hearth 74 and melted by applying heat thereto by means of heating elements 77. The slope of the hearth is such that the slabs will not slip or slide down the hearth and into the crucible 70 but molten material formed as the slab melts will readily drain from the hearth into the crucible to form a bath 80 of molten material therein. Heating elements 71 maintain bath 80 at the desired temperature and molten material from bath 80 may then be drawn off from the bottom of the bath by means of tubular conduit 26 as desired and the flow controlled by means of a suitable control valve 27, shown in FIG. 1, so that the bath depth in crucible 15 may be readily controlled. The heated conduit or launder 28 serves to prevent loss of heat and solidification of molten material in the conduit from the valve 27 to the crucible 15 and may be supplied with heat in any convenient manner. If desired, a neutral or reducing gas atmosphere such as nitrogen or a mixture of nitrogen and carbon monoxide, for example, may be continuously supplied to the crucible 70 by means of a conduit 81 and as this atmosphere escapes through passage 76 it prevents oxidation of the molten and melting material upon the hearth and sweeps out contaminants which may be evolved by the effect of heating the natural surface contamination present in many materials of which the slabs may be composed. If the atmosphere employed is reducing, reduction of oxides may also be accomplished. A principal advantage arising from adding material to crucible 15 from an apparatus as illustrated in FIGS. 7 and 8 is that the material is introduced to the bath 33 in the molten state and does not drastically alter the temperature of bath 33, as would be the case if massive bodies of solid material at room temperature were added to the bath. This renders the temperature as well as the depth of the bath 33 much easier to control.

By way of example, I will now describe a typical operation of the apparatus of my invention. A length of commercially obtained nominal 5/16 inch diameter copper rod 1 (actually measuring 0.307 inch in diameter) was passed through straightener 4, cleaner 5, washer 6, guide 7, drier 9, vacuum entrance chamber 12 and entrance port 14 into crucible 15. A bath 33 of molten copper 6 inches in depth was maintained in crucible 15 by controlled, continuous addition of molten copper from furnace 25 to replace copper removed from bath 33 by body 1 as it was passed therethrough. The temperature of the bath 33 was maintained at about 1120° C., the temperature of the body 1 entering the bath was approximately room temperature or about 25° C. and the rod 1 was passed through the bath 33 at a rate of about 40 feet per minute.

The body 16 emerging from the bath had a substantially circular configuration and was passed through sizing rolls 17 and cooling conduit 18 to a receiving container 19. The surface temperature of body 16 as it emerged from bath 33 was of the order of 1000° C. and, as is well known in the art, copper oxidizes very severely in the air at elevated temperatures. Therefore, an enclosure was provided for the top of crucible 15 which enclosed rolls 17 and joined cooling conduit 18. An atmosphere of nitrogen was provided for the enclosure including conduit 18 to effectively prevent oxidation of rod 16.

The average diameter of circular cross-section rod 16 at room temperature was 0.529 inch. From this it may be seen that the ratio of output to input is about 3.10 to 1. Stated otherwise, each pound of body 1 passed through bath 33 had about 2.1 pounds of copper deposited thereon by accretion.

While the foregoing example specifically illustrates the application of my invention to a particular material, size and configuration of input body, depth of bath, speed of input body and bath temperature, it is to be understood that all these factors may be varied without departing from the scope of my invention. Further, it will be readily apparent to those skilled in the mechanical arts that while I have disclosed that preferably a portion of body 16 is reduced in cross-sectional area and configuration to form a body 1' having a length substantially equal to the length of body 1 and that this body 1' is utilized to replenish body 1 and the remainder of body 16 is diverted as product 23, that all of body 16 may be reduced to the cross-sectional area and configuration of body 1 and the entire body recirculated any number of times through bath 33 before a product 23 is segregated or removed. It may similarly occur to those skilled in the art that the apparatus illustrated in FIG. 1 may be only one stage in a series of similar organizations in which product 23 is allowed to remain at its largest cross-sectional area, i.e., that of body 16, and is used as an input body 1 in a subsequent stage to produce a yet larger cross-section body. It is obvious that in this manner elongated bodies having larger and larger cross-sectional areas may be advantageously produced if desired. While the preceding disclosure has been directed to apparatus in which the entry port is located in the bottom of crucible 15, it is contemplated that body 1 may enter the crucible at any point below the surface of bath 33 and pass therethrough in any attitude consistent with the particular structure of the apparatus and the thermal and other metallurgical characteristics of the material employed. Therefore, I declare it to be my intention to cover all changes and modifications of the example of my invention herein chosen for purposes of the disclosure which do not constitute departures from the spirit and scope of my invention, nor do I wish to be limited in any sense except as defined by the following claims.

What I claim as new and desire to secure by Letters Patent of the United States is:

1. An apparatus for the continuous casting of metal by running an elongated solid body into a molten bath of metal at a point below the bath surface and running the body through the bath and into the space above the surface of the bath, which comprises a crucible having a molten metal bath-containing chamber, entrance chamber means providing an entrance chamber removed from the crucible bath-containing chamber, means for creating and maintaining a vacuum in the entrance chamber, entrance port means disposed between the entrance chamber and the crucible bath-containing chamber and having a passageway connecting the said bath-containing chamber and entrance chamber and opening into the said bath-containing chamber below the normal molten metal bath surface level therein, the entrance port passage having a portion to cooperate with an elongated solid body passing through the entrance port means in providing a seal against molten metal flow from the crucible bath-containing chamber to the entrance chamber, and means for running the elongated body through the entrance chamber and the entrance port means passageway and into and upwardly through the crucible bath-containing chamber.

2. An apparatus for the continuous casting of metal by running an elongated solid body into a molten bath of metal at a point below the bath surface and running the body through the bath and into the space above the surface of the bath, which comprises a crucible having a molten metal bath-containing chamber, entrance chamber means providing an entrance chamber removed from the crucible bath-containing chamber, means for creating and maintaining a vacuum in the entrance chamber, entrance port means disposed between the entrance chamber and the crucible bath-containing chamber and having a passageway connecting the said bath-containing chamber and entrance chamber and opening into the said bath-containing chamber below the normal molten metal bath surface level therein, the entrance port passage having a portion to cooperate with an elongated solid body passing through the entrance port means in providing a seal against molten metal flow from the crucible bath-containing chamber to the entrance chamber, and means for running the elongated body through the entrance chamber and the entrance port means passageway and into and upwardly through the crucible bath-containing chamber, said entrance port means comprising a refractory metal bushing having one end disposed for contact with molten metal in the crucible, and means for extracting heat from the bushing including a thermally-conductive body joined in heat exchange relation to the other end of the bushing and having an aperture cooperating with the bushing to provide the said passageway from the entrance chamber to the bath-containing chamber of the crucible.

3. A continuous casting apparatus comprising in combination a crucible, a bath of molten metal contained within said crucible, said crucible having a wall provided with an elongated tubular conduit comprising an entry port secured to and extending through said wall providing a passageway in communication with said bath of molten metal located below the surface of said bath, a plurality of substantially parallel, spaced, centrally apertured, diaphragm members secured within said tubular conduit, means for evacuating the zones between said diaphragms, an elongated solid body of metal extending through said apertured diaphragms in said elongated tubular conduit and said bath of molten metal, and means for driving said elongated solid metal body through said tubular conduit and said metal bath.

4. A continuous casting apparatus comprising in combination a crucible, a bath of molten metal contained within said crucible, means for maintaining said molten metal fluid, said crucible having a wall provided with an elongated tubular conduit comprising a tubular refractory bushing secured to and extending through said wall, a tubular metallic bushing secured within said refractory bushing in telescopic relationship therewith and providing a passageway in communication with said bath of molten metal located below the surface of said bath, means for extracting heat from said metallic bushing, a plurality of substantially parallel, spaced, centrally apertured, diaphragm members secured within said tubular conduit defining a series of chambers, each diaphragm member having its centrally disposed aperture in registry with the aperture in each other diaphragm member and with said tubular metallic bushing, means for evacuating the series of chambers, an elongated solid body of metal extending through said elongated tubular conduit and said bath of molten metal, the outer periphery of said body being in substantial line contact with the portions of each diaphragm member defining the aperture therein and being only slightly smaller than the passageway in said tubular metallic bushing, and means for driving said elongated solid metal body through said tubular conduit and said metal bath.

5. An apparatus for the continuous casting of metal by running an elongated solid body through a bath of molten metal comprising, a crucible having a chamber for holding a bath of molten metal, entrance port means attached to said crucible defining a passageway communicating with the interior of said crucible below the surface of the bath of molten metal, means located adjacent said entrance port means forming an entrance chamber outside of said crucible, means positioned within said entrance chamber means separating said chamber into a plurality of smaller entrance chambers, means for creating a vacuum within each of said smaller entrance chambers to remove gaseous and water vapor contaminants from the surface of an elongated solid body as it passes therethrough, and means for driving the elongated body through each of said smaller vacuum entrance chamber means and said entrance port means into the molten metal in the interior of said crucible.

6. An apparatus as defined in claim 5 wherein said means dividing said vacuum entrance chamber into a plurality of smaller vacuum entrance chambers comprises a plurality of diaphragm members secured in substantially parallel spaced relationship.

References Cited in the file of this patent

UNITED STATES PATENTS

| | | |
|---|---|---|
| 770,130 | Trotz | Sept. 13, 1904 |
| 1,531,747 | Hazelett | Mar. 31, 1925 |
| 2,019,496 | Kohlhaas | Nov. 5, 1935 |
| 2,123,894 | Hazelett | July 19, 1938 |
| 2,371,604 | Brennan | Mar. 20, 1945 |
| 2,376,518 | Spence | May 22, 1945 |
| 2,480,711 | Calton | Aug. 30, 1949 |
| 2,714,752 | Wilson | Aug. 9, 1955 |
| 2,716,790 | Brennan | Sept. 6, 1955 |
| 2,749,609 | Francis et al. | June 12, 1956 |

FOREIGN PATENTS

| | | |
|---|---|---|
| 421,539 | Great Britain | Dec. 17, 1934 |
| 735,642 | Great Britain | Aug. 24, 1955 |